Sept. 16, 1924.

C. LITSCHGI

BIRD CAGE

Filed Oct. 26, 1922

1,508,458

INVENTOR
Charles Litschgi
BY
Warren S. Orton.
ATTORNEY

Patented Sept. 16, 1924.

1,508,458

UNITED STATES PATENT OFFICE.

CHARLES LITSCHGI, OF NEW YORK, N. Y.

BIRD CAGE.

Application filed October 26, 1922. Serial No. 596,959.

*To all whom it may concern:*

Be it known that I, CHARLES LITSCHGI, a citizen of the United States, and resident of New York city, in the county of Queens and State of New York, have invented certain new and useful Improvements in Bird Cages, of which the following is a specification.

The invention relates in general to a bird cage of the knock-down type and the invention specifically relates to such a bird cage particularly designed for use in connection with breeding birds and the rearing of their young.

Much difficulty is at present experienced by bird breeders especially in the rearing of the young birds by the prevalent appearance of lice and other vermin which attack the young birds. In accordance with present practice it is usual to subject a cage in which there has been a hatching to an intense cleaning which may be regarded as a bacteriological treatment of the cage rather than a usual surface or perfunctory cleaning operation. Bird cages now in general use have not been particularly designed for breeding purposes and usually contain corners, and other projections with re-entrant angles, or contain recesses and pockets which defeat ready access to the infinitesimally small vermin which become lodged in these cracks and recesses. In order to clean out the vermin and associated dirt it is vitally necessary that the several parts of the cage be so exposed as to permit the application of a brush to all parts in a vigorous scrubbing operation with suitable antiseptics.

Accordingly, one of the primary objects of the invention is to provide a knock down type of bird cage in which the separate elements will provide readily accessible flat units all parts of which may be exposed to scrubbing action.

Incidental to this general object the invention contemplates a structure in which the fastening elements are of a simplified construction which are not only exposed and readily accessible for a temporary cleaning while mounted in the cage parts but the invention also features fastening elements which can be removed in their entirety from the cage forming elements, and in this way permit the separate parts of the fastening means to be themselves subjected to a thorough cleaning before they are replaced in their position in the cleaned cage parts.

Another object of the invention is to provide a simplified construction in which the number of parts are reduced to a minimum, and accordingly, the invention features the use of one of the necessary bar elements on one side of the cage as a fastening means for securing this side element in position.

In mating birds it is desired that the male and female bird be kept in separate cages so that they may be transported separately, and at times it is desired that ready access from one cage to another be provided. Accordingly another object of the invention and again featuring simplicity of structure is to provide an arrangement whereby one or more of the bars of adjacently positioned cages may be removed so as to provide mutual communication between the cages, after which the bars can be reinserted and each cage restored to its normal complete condition.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the following description and in the claims, parts will be identified by specific names for convenience of expression but they are intended to be as generic in their application to similar parts as the art will permit.

Figure 1:
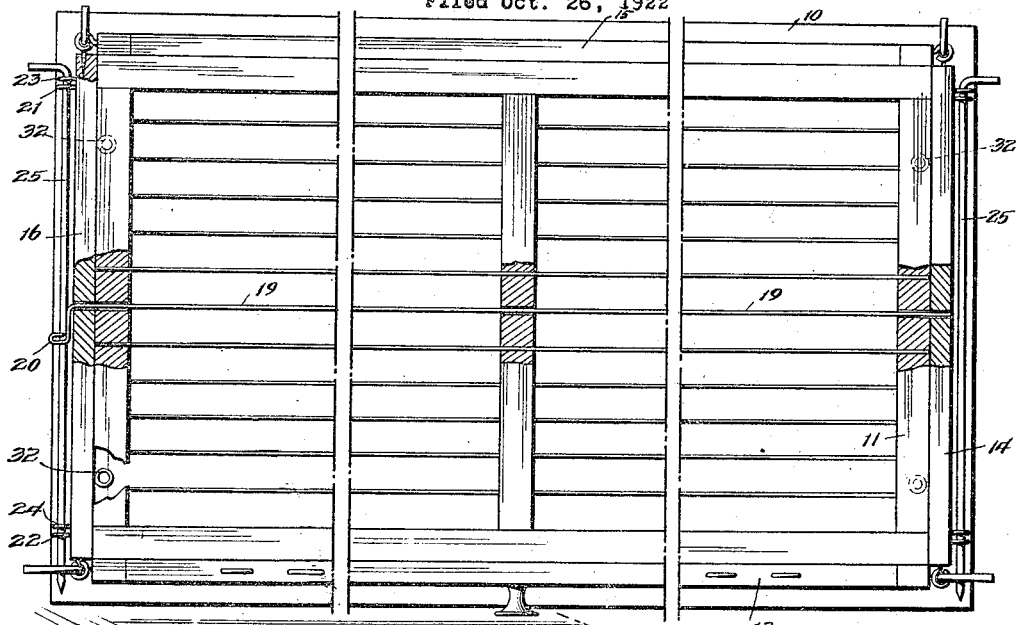
Figure 1 is a plan view looking down upon an assembled cage constituting a preferred embodiment of the invention and with parts broken away to show fastening means.

In the drawings there is shown a bottom 10, a top 11, and four upstanding side elements 13, 14, 15 and 16, designed when assembled to form a rectangular knockdown bird cage of conventional design. It is a feature of this disclosure that each of these elements when dismantled provides a flat unit free of lateral projections and all parts of which are fully exposed so as to permit the engagement therewith of a scrubbing brush in the act of antiseptically cleaning the structure. In the form of the device disclosed the sides and top element are each formed of a wooden frame 17, including outlining sills and a center sill through which are passed parallel cage bars 18. The cage bars are vertically disposed in the case of the upright sides as shown more particularly in Fig. 2 and longitudinally in the top as shown more particularly in Fig. 1. One means is suggested in Figure 1 for fastening the elements and in this showing one of the cage bars 19 extends loosely through the top frame and through the opposite side elements 14 and 16. One end of the bar 19 is provided with a finger piece 20 designed so that the bar may be readily grasped and withdrawn entirely from the top in the act of demounting the top from the remaining part of the cage structure.

It is suggested that this form of connection be utilized wherever the frame of one of the side elements laps a corresponding frame of another of the side elements.

In the form of the invention disclosed each of the side elements 13—16 is temporarily secured to the bottom element 10 and each of the side elements is secured at its vertical edge with the adjacent corresponding edge of the contiguous side by an eye and rod form of connection which features ready removability from the sides with which it is in engagement. Referring first to the connection of one of the sides, such as the side 16, with the base 10, it will be understood that one or more readily removable eyes 21 and 22 are screwed into the base member adjacent its edge and these eyes are caused to align with horizontally and outwardly projecting eyes 23 and 24 extending from the side 16. A horizontal fastening rod 25 is passed through the aligned eyes so as to secure the side 16 temporarily to the base or bottom element. It will be understood that the sides 14 and 15 are similarly connected to and rest upon the base. Similarly the side elements are secured together by vertically extending eye and rod connections.

Figure 2:
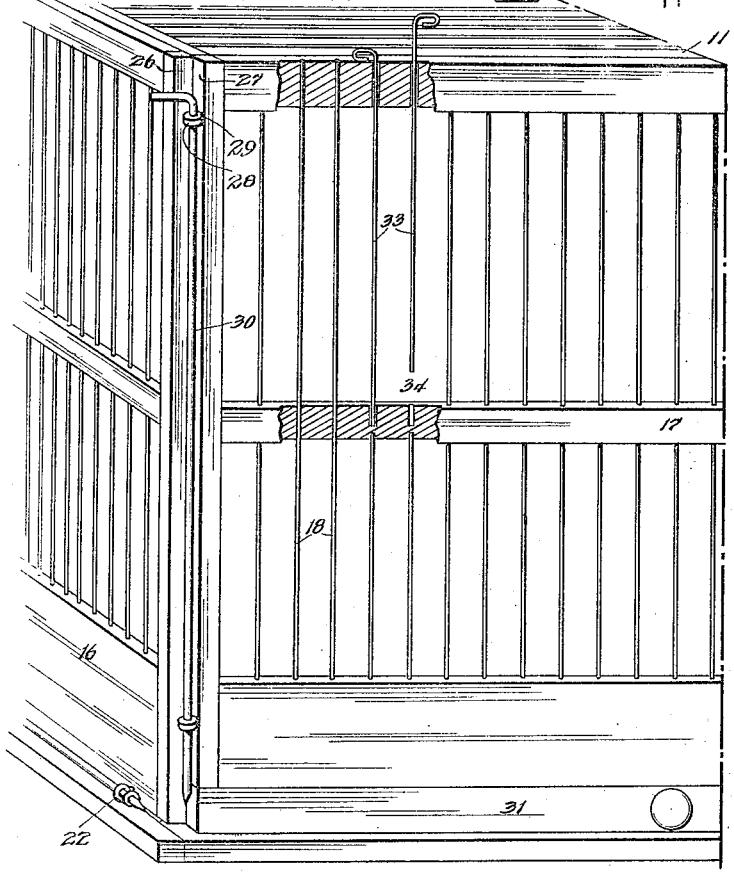
Figure 2 is a perspective view of one corner of the cage, it being understood that the other three corners are of substantially similar construction.

In order to have the edges of the side elements exposed for readily cleaning when the fastening rods are removed, the side elements are attached to each other in order, and with the adjacent edges 26 and 27 exposed as shown in Figure 2 and with one eye 28 extending laterally from the edge 26 and another eye 29 similarly extending from the edge 27. These sets of eyes may be duplicated as desired along the length of exposed edges and a connecting rod 30 passed down through the aligned eyes.

In the case of the front side elements 13, it is preferred to suspend this side above the bottom so as to accommodate a removable drawer 31 within the outlines of the cage and between the side elements and above the bottom. For the purpose of suspending this front side element 13 one or more of the eyes on opposite sides of this front element rests upon and are supported by corresponding eyes from the side elements 14 and 16.

Similarly, the top element 11 is supported by a plurality of inwardly extending eyes 32 projecting from the sides 14 and 16 and forming readily removable brackets for supporting the top element within the side elements and preferably with the top flush with the top edges of the side elements.

The cage herein disclosed may be provided with the usual form of door (not shown) and additionally one or more of the bars 18, such for instance, as the bars 33 are loosely mounted in the frame so as to be readily withdrawn therefrom and in this way provide an opening 34. This opening is designed to communicating with a similar opening in another abutting cage in those cases where it is desired to provide communication between similar forms of cages such as is herein disclosed.

In operation and assuming that it is desired to clean the complete cage, the bar 19 is removed and the top lifted from the side elements. The rods 30 and 25 are removed from their associated eyes and the drawer withdrawn, which leaves all parts as flat sections. The parts can then be cleaned by a scrubbing or other cleansing operation, and if a particularly effective cleaning is desired, all of the metal eyes can be quickly unscrewed from the frames and these metal parts subjected to a boiling or other cleansing operation while the sides, bottom and top sections are being cleaned.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:—

1. A rectangular knock-down bird cage comprising a flat bottom, and certain upstanding flat sides resting on the bottom, said sides free of angled extensions, one of said sides having a pair of readily removable screen eyes projecting outwardly therefrom adjacent its lower edge, said bottom provided with a pair of upwardly extending and readily removable eyes aligned with the eyes projecting from the upstanding side, a removable horizontally extending rod inserted in the aligned eyes to secure said side temporarily to the bottom, said side so secured to the bottom and an adjacent side each having its contiguous edge exposed outwardly or offset from the other side, each of said edges provided with aligned, readily removable eyes and a vertically extending and readily removable rod inserted through said last named eyes for temporarily securing the sides to each other.

2. A rectangular knock-down bird cage formed of a flat bottom, and top and side elements, each element comprising an outlining rectangular frame, and spaced apart bars within each frame, each element forming, when separated from the other elements, a flat one-piece unit free of extensions with straight edges and with all parts exposed and readily accessible and easily removable for cleaning and readily accessible means including screw eyes and fastening rods threaded through the eyes and both the eyes and rods exposed on the outside of the cage for temporarily securing the elements in position to form the complete cage.

3. A knock-down bird cage including upstanding side elements formed in part of bars, means for fastening the side elements in position to form the sides of the cage, certain of said elements provided on the inner sides thereof with readily removable screw eyes constituting top supporting brackets positioned below the top edges of the side elements, a top element fitted within the assembled sides and resting on said brackets and means for temporarily securing the top element in place.

4. A knock-down bird cage including four upstanding side elements, means for temporarily securing the same in position, a top element including parallel cage bars and fitted within the assembled side elements, and one of said cage bars extending across the top element, projecting beyond opposite edges thereof and said projecting ends extending through the adjacent side elements to fasten the top element to said side elements.

5. A knock-down bird cage including four upstanding side elements, means for temporarily securing the same in position, a top element including parallel cage bars and fitted within the assembled side elements, and one of said cage bars extending across the top element, projecting beyond opposite edges thereof and said projecting ends extending through the adjacent side elements to fasten the top element to said side elements, one of said projecting ends formed into a finger piece to facilitate the ready withdrawal of the bar in separating the top element from the side elements.

6. A knock-down bird cage designed for breeding purposes and having one side flat and adapted to abut a similar side of another cage, said side including horizontally extending sills and vertically extending wire bars passed through certain of the sills, one of said bars extending loosely into the sills and provided at its upper end with a finger piece to facilitate its ready removal when the cage is in position abutting the other cage and thus provide a temporary opening distinct from the usual door to permit the bird to pass from the cage with the rod so removed into said other cage.

7. A knock-down bird cage, the combination of a bottom element, two side elements resting on the bottom element, and a front element suspended above the bottom element, the front edge of each side element provided with a forwardly extending eye, opposite edges of the front element provided with laterally extending eyes overlapping and aligned with the adjacent eye of the side element, a securing member passed through the aligned eyes thereby to secure the front element to the side elements and the eyes from the front element resting on the eyes from the side elements thereby to support the front element from the side elements.

Signed at New York city in the county of New York and State of New York this 24th day of October, A. D. 1922.

CHARLES LITSCHGI.

Witness:
SARA A. THORNTON.